Feb. 6, 1934.   J. STROUF   1,945,760
VALVE
Filed July 3, 1928

JAMES STROUF Inventor
By Herbert C. Smith,
Attorney

Patented Feb. 6, 1934

1,945,760

UNITED STATES PATENT OFFICE 1,945,760

VALVE

James Strouf, Stratford, Wash.

Application July 3, 1928. Serial No. 290,249

1 Claim. (Cl. 277—67)

My present invention relates to improvements in valves that are designed especially for use as hose connections. While the valve of my invention is capable of use in various ways, it is particularly adapted for use with garden hose for irrigating purposes. The valve is connected at one end of the hose and is designed for detachable connection with a stationary nipple that is fixed to a ground pipe. In carrying out the invention, I utilize a number of ground pipes for supplying water to different portions of a garden or lawn, and these water pipes are equipped with outlet nipples to which the valve of the hose may readily be attached for use of the hose. Means are provided whereby the hose valve may with facility be attached and detached to the stationary connection, and means are provided whereby the hose may be drained of water and the attachment remain on the outlet water pipe.

The invention consists in certain novel combinations and arrangements of parts as will hereinafter be more fully set forth and claimed.

In the accompanying drawing, I have illustrated one complete example of the physical embodiment of my invention wherein the parts are combined and arranged according to the best mode I have so far devised for the practical application of the principles of my invention.

Figure 1:
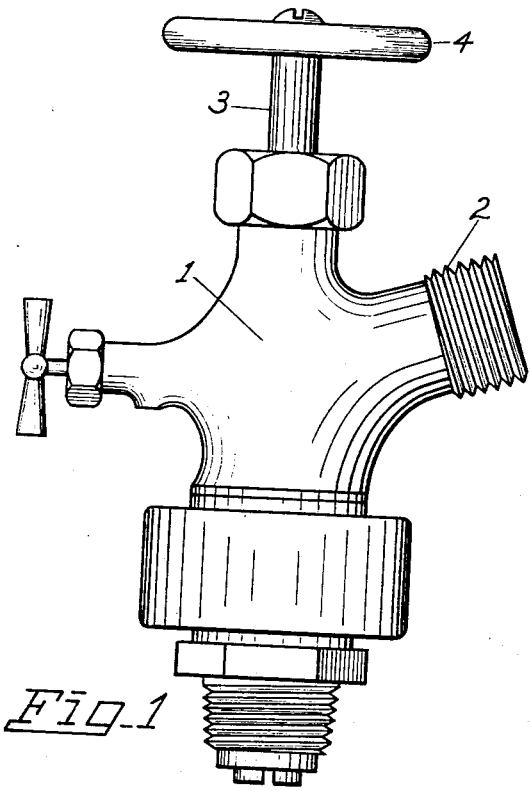
Figure 1 is a view showing the valve and the coupling nipple attached thereto.

In carrying out my invention, I utilize a valve casing 1 having an exterior threaded nipple 2 to which the hose may be attached, and the valve stem 3 is provided with screw threads 3' and a hand wheel 4 for manipulation of the valve. At the lower end of the valve casing, a detachable coupling 5 is secured by means of its threaded sleeve 6 that is screwed into the lower portion of the valve casing, and this coupling remains as a stationary and rigid member of the valve casing 1. The coupling 5 has an annular bottom flange 7 in which are fashioned a number of diametrically arranged notches 8, and this coupling member 5 provides means on the valve for quick connection to the pipe nipple 9.

The pipe nipple 9 or connector is provided with exterior threads 10 and by means of these threads the nipple is screwed into the end of an outlet pipe of an irrigating system. This system may comprise a number of horizontally extending water pipes below the surface from which vertical outlet pipes arise and the pipe nipple 9 is screwed into the upper threaded end of one of these outlet pipes. All of the outlet pipes may be equipped with these nipples, or the nipple may be used to attach to any suitable threaded member.

Figure 2:
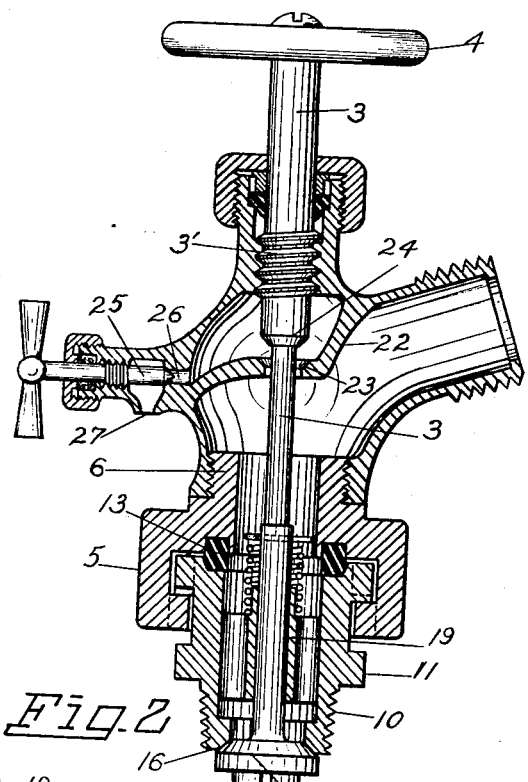
Fig. 2 is a vertical sectional view of the device of Fig. 1.
Figure 3:
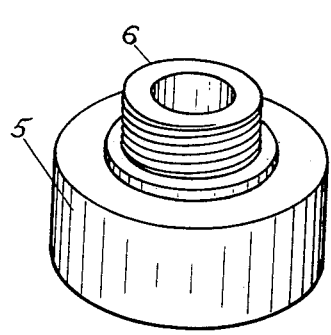
Fig. 3 is a perspective view of the coupling nipple of the valve.
Figure 5:
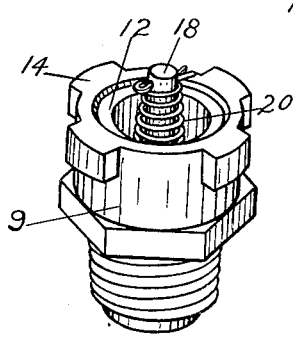
Fig. 5 is a perspective view of the pipe nipple or connector.
Figure 6:
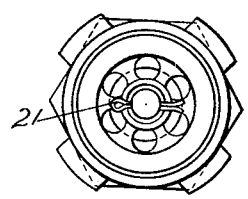
Fig. 6 is a bottom plan view of the pipe connector or nipple.
Figure 4:
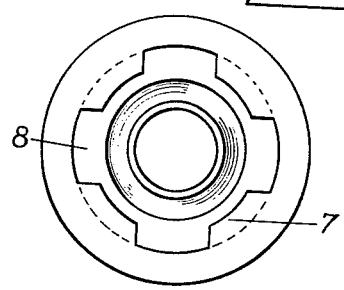
Fig. 4 is a top plan view of the coupling nipple of the valve.
Figure 7:
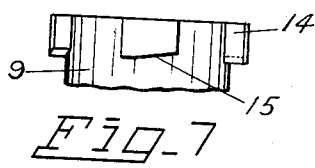
Fig. 7 is an edge view showing the locking lugs of the pipe nipple.

The nipple is provided with a nut portion 11 so that it may be screwed tightly into the threaded socket of the outlet pipe. In order to secure a non-leaking joint between the coupling 5 and the nipple 9, the latter is provided with a seat 12 in its upper end and a gasket or washer 13 is secured between the coupling 5 and the nipple 9 as indicated in Fig. 2.

The coupling 5 is locked to the stationary nipple 9 by means of a plurality of lugs 14 on the exterior of the nipple 9 and these lugs have cam faces 15 that are adapted to bear on the inner faces of the flange 7 of the coupling 5. Thus the valve casing is applied to the nipple by slipping the notches 8 over the lugs 14 and then by a slight turn of the valve casing the cam lugs 14 interlock with the lugs 7 and the valve casing is tightly secured on the nipple 9.

In the bottom of the nipple 9, a tapered valve seat 16 is provided and a complementary valve 17 is designed to close passage of water through this seat. The valve 17 is fashioned intergal with a stem 18 and the latter is adapted to reciprocate in a sleeve 19 of the nipple 9. A spring 20 is interposed between the sleeve 19 and a cotter pin 21 and the spring is coiled about the stem 18 to normally hold the valve 17 in its seat 16. In Fig. 2, it will be seen that the lower end of the rotary valve stem 3 is in contact with the upper end of the reciprocating valve stem 18. By turning the hand wheel 4 it will be apparent that the stem 3 will push on the stem 18 and unseat the valve 17 to permit the water to pass through the valve casing and thence to the hose for irrigating purposes. In order to close the valve 17, the hand wheel 4 is turned in reverse direction, and then the spring 20 lifts the valve 17 into closed position.

In order to drain the valve casing as well as the hose to which the valve casing is attached, I provide the valve casing with an interior web 22 that has a drain valve seat 23 and the rotary stem 3 is fashioned with a valve 24 to fit this seat. When the valve 17 is opened, the valve 24 is closed, and of course when the valve 24 is opened, the valve 17 is closed. With the valve 24 open, the water from the hose is permitted to drain through the valve seat 23 and the valve casing 1 is provided with an outlet valve 25 which normally closes a valve seat 26, and this valve seat communicates with a drain port 27. By turning the outlet valve 25 to open position, the water from the hose may drain through the open valve seat 23, valve seat 26 and thence through the outlet or drain port 27.

It will be apparent from the above description taken in connection with my drawing that I have provided a portable device which may with facility be carried from one station to another and attached to or detached from various water outlets in the irrigating system, and that the device is capable of performing its functions in an efficient manner.

Having thus fully described my invention, what I claim as new and desire to secure by Letters Patent is—

In a valve device capable of use for a hose connection, the combination of a casing having an upper outlet port and means for coupling to a pipe-line, an angular partition in the casing having a valve seat and forming a drain chamber separate from the main portion of the casing, a manually operated screw-threaded valve stem mounted in the casing and projecting through said valve seat, a valve on the stem for closing said seat, a drain nozzle connected with the drain chamber, and a manually operated screw-threaded valve for controlling passage of water through said drain nozzle.

JAMES STROUF.